United States Patent
Petkov et al.

(10) Patent No.: US 10,064,132 B2
(45) Date of Patent: Aug. 28, 2018

(54) BIDIRECTIONAL WIRELESS DATA TRANSMISSION METHOD

(71) Applicant: DIEHL METERING SYSTEMS GMBH, Nuremberg (DE)

(72) Inventors: Hristo Petkov, Nuremberg (DE); Thomas Lautenbacher, Erlangen (DE); Thomas Kauppert, Nuremberg (DE); Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 104 days.

(21) Appl. No.: 15/241,300

(22) Filed: Aug. 19, 2016

(65) Prior Publication Data
US 2017/0055210 A1 Feb. 23, 2017

(30) Foreign Application Priority Data
Aug. 19, 2015 (DE) .................. 10 2015 010 944

(51) Int. Cl.
*H04W 52/02* (2009.01)
*H04Q 9/00* (2006.01)
(Continued)

(52) U.S. Cl.
CPC ...... *H04W 52/0212* (2013.01); *H04B 7/0632* (2013.01); *H04B 17/336* (2015.01);
(Continued)

(58) Field of Classification Search
None
See application file for complete search history.

(56) References Cited

U.S. PATENT DOCUMENTS 6,421,007 B1 * 7/2002 Owen ............... G01S 3/023
342/417
6,421,541 B1 * 7/2002 Karlsson ........... H04L 1/0025
370/437
(Continued)

FOREIGN PATENT DOCUMENTS

DE 102010005587 A1 7/2011
EP 2360484 A2 8/2011
(Continued)

OTHER PUBLICATIONS

Link Adaptation, Wikipedia, URL: https://en.wikipedia.org/wiki/Link_adaptation.
UMTS Power Control, 2003—www.umtsworld.com/technology/power.htm.

*Primary Examiner* — Anh Ngoc M Nguyen
(74) *Attorney, Agent, or Firm* — Laurence A. Greenberg; Werner H. Stemer; Ralph E. Locher

(57) ABSTRACT

In a bidirectional wireless data transmission system meter transmitters and concentrators communicate in wireless uplink and downlink connections. In order to be able to receive measured value data messages more reliably from the meter transmitters, the quality of wireless uplink connections which can be better received is reduced. This is done in that the concentrator acts with control signals via wireless downlink connections on parameters, such as transmitting power or message management, of the control of uplink transmitters. For this, uplink quality criteria automatically retrievable in the concentrator are, in particular, absolute or relative levels, signal-to-noise ratio and a relative number of receivable data messages.

19 Claims, 1 Drawing Sheet

(51) Int. Cl.
*H04B 17/336* (2015.01)
*H04B 7/06* (2006.01)
*H04W 72/04* (2009.01)

(52) U.S. Cl.
CPC .......... *H04Q 9/00* (2013.01); *H04W 72/0473* (2013.01); *H04Q 2209/40* (2013.01); *H04Q 2209/60* (2013.01); *Y02D 70/00* (2018.01); *Y02D 70/142* (2018.01); *Y02D 70/144* (2018.01)

(56) References Cited

U.S. PATENT DOCUMENTS

| | | | |
|---|---|---|---|
| 7,304,587 | B2 | 12/2007 | Boaz |
| 2011/0140909 | A1 | 6/2011 | Olson et al. |
| 2011/0306307 | A1 | 12/2011 | Kauppert |
| 2014/0226676 | A1* | 8/2014 | Afkhami ............... H04L 47/626 370/412 |
| 2015/0035682 | A1 | 2/2015 | Sasaki et al. |
| 2016/0269964 | A1* | 9/2016 | Murray ................. H04W 36/08 |

FOREIGN PATENT DOCUMENTS

| | | |
|---|---|---|
| EP | 2395686 B1 | 8/2016 |
| WO | 2007139842 A2 | 12/2007 |
| WO | 2015096916 A1 | 7/2015 |

\* cited by examiner

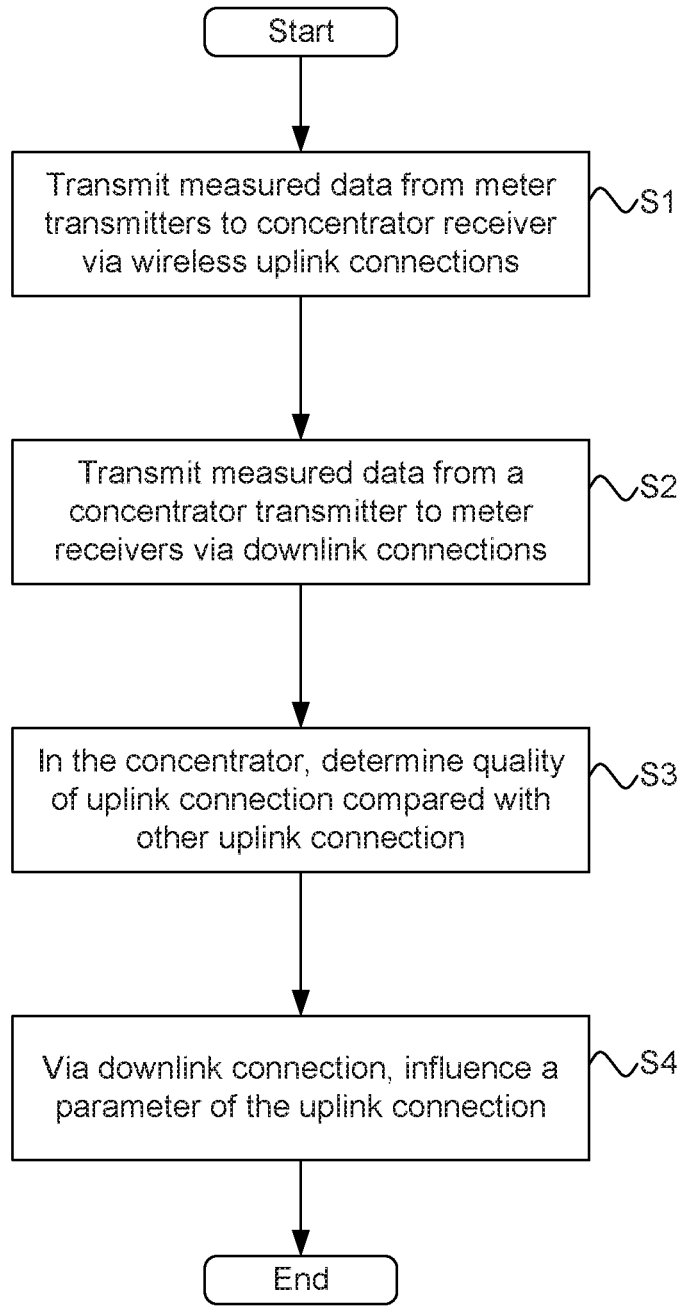

BIDIRECTIONAL WIRELESS DATA TRANSMISSION METHOD

CROSS-REFERENCE TO RELATED APPLICATION

This application claims the priority, under 35 U.S.C. § 119, of German patent application DE 10 2015 010 944.8, filed Aug. 19, 2015; the prior application is herewith incorporated by reference in its entirety.

BACKGROUND OF THE INVENTION

Field of the Invention

The invention relates to a method for a bidirectional wireless connection, i.e., a bidirectional wireless data transmission method for transmitting measured value data messages from meter transmitters via wireless uplink connections to a concentrator receiver and with wireless downlink connections of a concentrator transmitter to meter receivers.

Such systems are described, for example, in European published patent application EP 2 360 484 A2. The system presented there can have the arrangement of a plurality of power, fluid (such as gas or water) or heat quantity consumption-recording devices used in a distributed manner, referred to below simply as meters. Each of said meters is equipped with a transmitter to transmit its individualized, digitized measured values as messages to a remotely operated central receive device referred to below as a concentrator (RDC, radio data concentrator) using short-range radio via an wireless uplink connection. Measured value transmissions of this type are normally performed in an unsynchronized manner with identical performance data and constant lengths of the messages which are repeated multiple times. Particularly for consumption billing, the measured values temporarily stored in the concentrator and recoded if necessary are periodically read by a service employee if the concentrator is not in contact with a mass storage device for quasi-continuous data transmission via a communication connection, such as, for example, via a mobile network, WLAN or Ethernet, particularly in the case of a public utility company.

A system of this type can be configured by means of transceivers in the meters and in the concentrator for bidirectional data transmissions so that the data transmissions can be performed via wireless connections not only from the meter transmitters to the concentrator receiver (uplinks), but also from a concentrator transmitter to meter receivers (downlinks). The wireless downlink connections according to the hitherto known method can be used, inter alia, for the tariff control of energy consumers allocated to the meters. A downlink consumer control can be appropriately effected via a frequency band approved for higher transmitting power, compared with the wireless uplink connections for the measurement data transmission.

Instead, the present focus is on the quality of the wireless uplink connections. This is assessed, for example, via the receive level and/or via the signal-to-noise ratio in the receive signal. They depend on different constant and variable conditions. These are, on the one hand, for example, different building-related attenuations depending on the shielding conditions and distances between the individual installation locations of the meters and the installation location of the concentrator; and there are, on the other hand, for example, stronger-level and weaker-level wireless uplink connections instantaneously superimposed on one another at the receiving location in the receive channel. Assessable reception of measured value messages is therefore actually achievable only rarely or almost not at all via various wireless connections of this type.

SUMMARY OF THE INVENTION

The underlying technical object of the invention is to avoid such effects; namely, in particular, taking account of the fact that, on the one hand, according to the current standard, the meters along with their transmitters and receivers (transceivers) are equipped with non-replaceable energy sources (primary batteries) which are usually intended to guarantee a ten-year uninterrupted operation, which already imposes narrow constraints on a mere increase in the transmitting power of weakly receivable transmitters; and that, on the other hand, according to the relevant standards for the use of the ISM bands for close-range data radio, usage limitations must be observed, for example in terms of level, frequency bandwidth and relative duty cycle in their individual channels.

With the above and other objects in view there is provided, in accordance with the invention, a bidirectional wireless data transmission method, which comprises:

transmitting measured value data messages from meter transmitters via wireless uplink connections to a concentrator receiver and transmitting from a concentrator transmitter to meter receivers via wireless downlink connections;

determining, in the concentrator, information relating to a quality of a wireless uplink connection compared with at least one other wireless uplink connection in a program-controlled manner; and influencing, via the wireless downlink connection, at least one parameter of at least one of the wireless uplink connections by degrading the at least one parameter in a direction towards a quality of a poorer but still functional wireless uplink connection.

Thus, uplink transmission parameters of the currently better-receivable transmitters are above all varied, radio-controlled from the concentrator, until, statistically evaluated, they are leveled approximately to the receive conditions of those transmitters which still supply sufficient receive field strength for reliable measured value transmissions.

In accordance with an added feature of the invention, the at least one parameter is the transmitting power and/or a number of message repetitions and/or a message length.

In accordance with an additional feature of the invention, receive levels are used as quality criteria. Similarly, signal-to-noise ratio conditions or the numbers of usably receivable measured values may be used as quality criteria.

In accordance with another feature of the invention, the at least one parameter is a waveform chosen for the transmission. This may be, for example, 802.15 or WMBus or WLAN or some other proprietorz waveform.

In accordance with another feature of the invention, transmission parameters are varied in relation to quality criteria.

In accordance with a further feature of the invention, wireless downlink connections are implemented in a frequency band which is permitted for transmitting powers that are higher in comparison with the wireless uplink connections.

In accordance with yet an added feature of the invention, error correction methods are used in receiver-side superimposition of messages. In a further implementation, the reception of a comparatively short message is not adversely affected in the case of at least one superimposition with a comparatively longer message due to error correction. Alternatively, the error correction and the entire bit transmission layer support a negative signal-to-noise ratio so that data of the messages received with a negative signal-to-noise ratio are transmittable in an error-free manner.

In accordance with yet an additional feature of the invention, the error correction and the entire bit transmission layer support a positive signal-to-noise ratio.

In accordance with yet another feature of the invention, in the case of the superimposition of two messages, their level difference is controlled via a power regulation in such a way that the level difference is less than the negative signal-to-noise ratio of the bit transmission layer in order to receive both messages.

In accordance with an alternative feature of the invention, in the case of the superimposition of two messages, their level difference is controlled via power regulation in such a way that it is greater than the signal-to-noise ratio of the bit transmission layer in order to receive at least one of the two messages.

In accordance with a concomitant feature of the invention, one of the two messages belonging to an external system is treated as an interference signal.

BRIEF DESCRIPTION OF THE DRAWING

The sole figure shows a flow chart of method steps.

DETAILED DESCRIPTION OF THE INVENTION

Since relatively too strong receive field strengths of uplink transmitters are thus in any case no longer dominantly superimposed on weaker receive field strengths, all transmitters transmitting their measured values according to the random access principle are in this respect more or less equally well received by the concentrator; i.e., from the receiver perspective, without a weak receive field strength being temporarily or even more or less permanently suppressed by a strong field strength superimposed on it. In S1, measured value date messages are transmitted from meter transmitters via wireless uplink connections to a concentrator receiver and in S2, transmitted from a concentrator transmitter to meter receivers via wireless downlink connections.

For this purpose, the concentrator is configured to exert influences in the downlink by means of control signals on the different meter transmitters according to automatic assessments of quality criteria of the measured value messages received from them on the uplink. Conventional statistical evaluation methods, such as signal-to-noise values (for example CQI, channel quality indicator or PER, packed error rate), implemented in the concentrator can deliver such assessments as quality criteria. In S3, information relating to a quality of a wireless uplink connection is determined, in the concentrator, compared with at least one other wireless uplink connection in a program-controlled manner.

However, a quality assessment can also already result simply from counting how much more frequently usable measured values are received from a specific transmitter on the uplink, compared with an uplink reference transmitter selected instantaneously or by default, the measured values of which are, on the other hand, only more unreliably received. In the case of the better-receivable transmitter, the number of message repetitions in the transmit interval, remotely controlled by the concentrator, can then be reduced to a fixed value or, according to the relationship concerned, as a percentage. As a result, the poorly receivable measured values are less frequently superimposed by the stronger receive field strengths of this dominant uplink transmitter. That is, they are ultimately more reliably received. At the same time, the reduced succession (duty cycle) of the message transmissions from the better-receivable uplink transmitter reduces the channel load. In S4, at least one parameter of at least one of the wireless uplink connections is influenced, via the wireless downlink connection, by degrading the at least one parameter in a directions towards a quality of a poorer but still functional wireless uplink connection.

Additionally or instead, according to one development of the invention, the transmitting power of the well-receivable uplink transmitter can be reduced, in the extreme case to the extent that it cannot be better received than a poorly receivable transmitter, or even only usable measured value messages. The collision of the messages that are then constantly more or less equally well receivable can be controlled at the receiving end by known signal processing and evaluation methods so that ultimately all uplink transmitters deliver usable measured value reception. A reduction of the radio channel occupancy load is based here on a reduction of unnecessarily strong transmitter levels.

Instead of or in addition to the two aforementioned options, the measured values of the uplink transmitters which can be well received by the concentrator can furthermore be transmitted at an increased data rate. Due to the higher data rate, the bit pulse durations and, with the data content remaining the same, the effective message durations are reduced. The receive quality of the messages at the concentrator and their aforementioned criteria form the basis of the criterion for increasing the data rate. If these comparatively short messages with an increased data rate are superimposed on the comparatively long messages with a normal transmission rate in the wireless transmission, the data of both messages can be reconstructed and correctly received using error correction methods. The data rate is set in such a way that, with these superimpositions, all messages concerned can be reconstructed at the receiver. The data throughput in the system and therefore the number of usable measured value messages are increased with this measure. Furthermore, the channel load and energy consumption of these uplink transmitters are reduced by means of the shorter messages.

As well as increasing reception reliability, with the consequence of faster processing of the communication connections, the result of each individual one of the aforementioned measures is that the channel occupancy load of the uplink channel is reduced; and the energy source of the uplink transmitter is simultaneously spared, the specified service life of which is therefore more reliably achieved.

An additional useful effect of the transmission optimizations is that the resulting transmit levels that are on average reduced, reduce electromagnetic environmental pollution.

Furthermore, beyond the uplink interventions, the wireless downlink connections for the transmission of control signals of the concentrator to the meter transmitters can be influenced according to the invention. It is assumed here, in a manner known per se, that the uplink and downlink data traffic are implemented in different radio channels; wherein, besides the duty cycles, transmitting powers having different maximum strengths are permitted via the individual radio channels available in the ISM bands for services of this type.

In the meter-side receivers, the respective instantaneous transmission quality of the concentrator control signal received on the downlink is again evaluated using standard methods such as CQI, RSSI or PER and is signaled back to the transceiver of the concentrator. In the latter, it is inferred therefrom which of the above options for the uplink measured value transmission will instantaneously optimize the data throughput. Furthermore, depending on the prevailing conditions, the downlink transmitting power can be reduced or increased by switching over to a channel of adapted reliability. The respective meter-side receiver receives the message from the concentrator, i.e. the instruction indicating the channel to which it should switch over for future downlink reception of any control signals from the concentrator.

In sum, in a bidirectional wireless data transmission system, in order to be able to receive measured value data messages more reliably from meter transmitters via wireless uplink connections at a concentrator, the quality of better-receivable wireless uplink connections is reduced in an intelligent manner according to the invention in order to increase the overall reliability of a system with many meters and concentrators. For this, the concentrator acts with control signals via wireless downlink connections on parameters, such as transmitting power or message management, of the operation of uplink transmitters. Uplink quality criteria automatically retrievable in the concentrator are, in particular, absolute or relative levels, noise and the relative number of receivable data messages.

The invention claimed is:

1. A bidirectional wireless data transmission method, which comprises:
    transmitting measured value data messages from meter transmitters via wireless uplink connections to a concentrator receiver and transmitting from a concentrator transmitter to meter receivers via wireless downlink connections;
    determining, in the concentrator, information relating to a quality of a wireless uplink connection compared with at least one other wireless uplink connection in a program-controlled manner; and
    influencing, via the wireless downlink connection, at least one parameter of at least one of the wireless uplink connections by degrading the at least one parameter in a direction towards a quality of a poorer but still functional wireless uplink connection.

2. The method according to claim 1, wherein the at least one parameter is a transmitting power or a transmitting frequency.

3. The method according to claim 1, wherein the at least one parameter is a number of message repetitions.

4. The method according to claim 1, wherein the at least one parameter is a message length.

5. The method according to claim 1, wherein the at least one parameter is a waveform chosen for the transmission.

6. The method according to claim 1, which comprises using receive levels as quality criteria.

7. The method according to claim 1, which comprises using signal-to-noise ratio conditions as quality criteria.

8. The method according to claim 1, which comprises using numbers of usably receivable measured values as quality criteria.

9. The method according to claim 1, which comprises varying transmission parameters in relation to quality criteria.

10. The method according to claim 1, which comprises implementing wireless downlink connections in a frequency band which is permitted for transmitting powers that are higher in comparison with the wireless uplink connections.

11. The method according to claim 1, which comprises using error correction methods on occasion of receiver-side superimposition of messages.

12. The method according to claim 11, which comprises not adversely affecting a reception of a comparatively short message on occasion of at least one superimposition with a comparatively longer message due to error correction.

13. The method according to claim 11, wherein the error correction and the entire bit transmission layer support a negative signal-to-noise ratio so that data of the messages received with a negative signal-to-noise ratio are transmittable in an error-free manner.

14. The method according to claim 11, wherein the error correction and the entire bit transmission layer support a positive signal-to-noise ratio.

15. The method according to claim 13, which comprises, in the case of a superimposition of two messages, controlling a level difference of the two messages via a power regulation in such a way that the level difference is less than a negative signal-to-noise ratio of the bit transmission layer in order to receive both messages.

16. The method according to claim 14, which comprises, in the case of a superimposition of two messages, controlling a level difference of the two messages via power regulation in such a way that it is greater than the signal-to-noise ratio of the bit transmission layer in order to receive at least one of the two messages.

17. The method according to claim 1, which comprises treating one of the two messages belonging to an external system as an interference signal.

18. The method according to claim 17, wherein the concentrator receiver or the meter receiver measure parameters of the interference signal as an interference length, a bandwidth, a power, or a probability of occurrence.

19. A bidirectional wireless data transmission method, which comprises:
    transmitting measured value data messages from meter transmitters via wireless uplink connections to a concentrator receiver and transmitting from a concentrator transmitter to meter receivers via wireless downlink connections;
    determining, in the meter, information relating to a quality of a wireless downlink connection compared with at least one other wireless downlink connection in a program-controlled manner; and
    influencing, via the wireless uplink connection, at least one parameter of at least one of the wireless downlink connections by degrading the at least one parameter in a direction towards a quality of a poorer but still functional wireless downlink connection.

* * * * *